US00RE36052E

United States Patent [19]

Kobayashi et al.

[11] E Patent Number: Re. 36,052

[45] Reissued Date of Patent: Jan. 19, 1999

[54] DATA PROCESSOR WITH BUS-SIZING FUNCTION

[75] Inventors: Souichi Kobayashi; Yuichi Saito, both of Hyogo, Japan

[73] Assignee: Mitsubishi Benki Kabushiki Kaisha, Japan

[21] Appl. No.: 617,467

[22] Filed: Mar. 18, 1996

Related U.S. Patent Documents

Reissue of:

[64] Patent No.: 5,394,528
Issued: Feb. 28, 1995
Appl. No.: 939,257
Filed: Sep. 2, 1992

[30] Foreign Application Priority Data

Nov. 5, 1991 [JP] Japan ..... 3-288394

[51] Int. Cl.[6] ..... G06F 13/40

[52] U.S. Cl. ..... 395/307; 395/855

[58] Field of Search ..... 395/306, 308, 395/309, 310, 307, 855

[56] References Cited

U.S. PATENT DOCUMENTS

| | | | |
|---|---|---|---|
| 4,514,808 | 4/1985 | Murayama et al. | 395/425 |
| 4,633,437 | 12/1986 | Mothersole et al. | 395/250 |
| 4,683,534 | 7/1987 | Tietjen et al. | 395/325 |
| 4,751,632 | 6/1988 | Mothersole et al. . | |
| 4,878,166 | 10/1989 | Johnson et al. | 395/325 |
| 5,113,369 | 5/1992 | Kinoshita | 395/325 |
| 5,125,084 | 6/1992 | Begun et al. | 395/375 |
| 5,146,572 | 9/1992 | Bailey et al. . | |
| 5,148,539 | 9/1992 | Enomoto et al. | 395/425 |
| 5,255,378 | 10/1993 | Crawford et al. | 395/325 |
| 5,280,598 | 1/1994 | Osaki et al. | 395/425 |
| 5,341,481 | 8/1994 | Tsukamoto | 395/287 |
| 5,388,227 | 2/1995 | McFarland | 395/307 |
| 5,548,786 | 8/1996 | Amini et al. | 395/842 |

FOREIGN PATENT DOCUMENTS

| | | |
|---|---|---|
| 0 369 964 | 5/1990 | European Pat. Off. . |
| 59-55525 | 3/1984 | Japan . |
| 61-502565A | 11/1986 | Japan . |
| 64-31252A | 2/1989 | Japan . |
| 2-140853A | 5/1990 | Japan . |
| 2-187849 | 7/1990 | Japan . |
| WO 86/00436 | 1/1986 | WIPO . |

OTHER PUBLICATIONS

Abstract, JLP 59–5525.

IEEE International Test Conference Digest of Technology Paper, pp. 826–832, 1987.

Intel i486™ Microprocessor Manual, Apr. 1989.

Intel i486™ Microprocessor Manual, Sections 7.13, 7.2.3, 7.2.4, 7.2.5, Oct. 1992.

Abstract, Electronic News, Aug. 17, 1989, V. 35 n. 1754 p1(2).

Abstract, Computer World, Apr. 10, 1989, V. 23 n.15 p. 37(2).

Abstract, PC Week, Apr. 10, 1989, V.6 n.14 p1(2).

*Primary Examiner*—Glenn A. Auve

*Attorney, Agent, or Firm*—Lyon & Lyon LLP

[57] ABSTRACT

A data processor capable of controlling memory accessing by the same controls regardless of the bus width to be used. A register is provided for storing data to be inputted and completing a block of data with a size equal to that of the whole bus width of the external data bus when the microprocessor accesses external memory by using only a part of the bus width of an external data bus according to a bus-sizing function. A bus interface is provided for starting memory access by dividing a bus cycle into plural portions according to the bus width and for controlling operation so as to access data equal in size to the case where the whole bus width of the external data bus is used for accessing.

34 Claims, 8 Drawing Sheets

FIG. 3

| | CONTROL SIGNAL 3A | CONTROL SIGNAL 3B |
|---|---|---|
| 64-BIT/32-BIT DATA BUS | 1 | 1 |

FIG. 5

| | 4A REGISTER | 4B REGISTER | 4C REGISTER |
|---|---|---|---|
| 3rd BIT FROM LOWER SIDE OF ADDRESS OF 64-BIT DATA BUS=0 | HIGHER 32 BITS OF D BUS | LOWER 32 BITS OF D BUS | HIGHER 32 BITS OF D BUS |
| 3rd BIT FROM LOWER SIDE OF ADDRESS OF 64-BIT DATA BUS=1 | LOWER 32 BITS OF D BUS | HIGHER 32 BITS OF D BUS | LOWER 32 BITS OF D BUS |
| 32-BIT DATA BUS | LOWER 32 BITS OF D BUS | LOWER 32 BITS OF D BUS | LOWER 32 BITS OF D BUS |

| | CONTROL SIGNAL 2A | CONTROL SIGNAL 2B | CONTROL SIGNAL 2C |
|---|---|---|---|
| 64-BIT DATA BUS | 1 | 0 | 1 |
| 32-BIT DATA BUS | 0 | 1 | 1 |

DATA PROCESSOR WITH BUS-SIZING FUNCTION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a data processor having a bus-sizing function, more particularly to a data processor capable of accessing data buses having bus widths different from each other according to a bus-sizing function.

2. Description of Related Art

Some data processors are capable of approximately accessing a memory system by switching the effective width of the data bus using a bus-sizing function when data is read/written during memory access.

The bus-sizing function includes dynamic bus-sizing and static bus-sizing. Dynamic bus-sizing as the capability of changing a bus width by designating a bus width every time memory is accessed. In static bus-sizing the bus width is fixed to a constant value after designating a bus width when the whole unit is reset.

In the following, an explanation will given of one example of a [conventional] data processor having a bus-sizing function as mentioned above and also having a cache.

FIG. 1 is a block diagram showing construction of a [conventional] data processor. This data processor is composed of a microprocessor 1 and an external memory 6 connected thereto by an external data bus 10 and an external address bus 11. Though the bus width of the external data bus D (0:63) 10 is 64 bits, using a static bus-sizing function, the bus width can be designated as either 64-bit width or 32-bit width. In the case where the external data bus 10 is used in a 32-bit width, accessing is carried out by using only lower 32 bits D (32:63) of the external data bus 10. The bit width of the external address bus A (0:31) 11 is fixed at a 32-bit width.

The microprocessor 1 is composed of a bus interface 2 and internal function circuits. The internal function circuits include an alignment circuit 3, a cache memory 4, an internal data operation circuit 5 and so on. Both the alignment circuit 3 and the cache memory 4 are connected to the bus interface 2 by a D bus 12, which is an internal data bus. The alignment circuit 3 and the internal data operation circuit 5 are connected with each other by an S bus 13, while the cache memory 4 and the alignment circuit 3 are connected with each other by a bus 14.

The data obtained over the external data bus 10 according to read-accessing from the external memory 6 is transferred to the alignment circuit 3 and the cache memory 4 through the bus interface 2 and the D bus 12. The read data is registered in the cache memory 4 as well as aligned by the alignment circuit 3. In the case where the data to be read is registered in the cache memory in advance, the data is transferred to the alignment circuit 3 from the cache memory 4 through the bus 14. The data having been aligned by the alignment circuit 3 is transferred to the internal data operation circuit 5 through the S bus 13. The respective bus width of the D bus 12, S bus 13 and bus 14 in the microprocessor 1 is 64 bits.

FIG. 2 is a circuit diagram showing a circuit for a data transferring system of the bus interface 2. This circuit is composed of tri-state buffers 30, 31 and buffers 32, 33. The bus 10H (which is the higher 32 bits of the external data bus 10) is connected to the bus 12H (which is the higher 32 bits of the D bus 12) through the buffer 32 and the tri-state buffer 30, and the bus 10L (which is the lower 32 bits of the external data bus 10) is connected to the bus 12L (which is the lower 32 bits of the D bus 12) through the buffer 33 and the tri-state buffer 31.

FIG. 3 is a schematic diagram showing logical levels of control signals 3A, 3B of the aforementioned tri-state buffers 30, 31 in reading data. In this state, the logical levels of the control signals 3A, 3B are always "1". Accordingly, data is ouputted from the bus 10H to the bus 12H and data is outputted from the bus 10L to the bus 12L.

FIG. 4 is a block diagram showing construction of the alignment circuit 3. In the alignment circuit 3, an 88-bit register 400 comprising a 4A register 40 of 32 bits, a 4b register 41 of 32 bits, a 4C register 42 of 24 bits is provided in order to store non-alignment data inputed from the D bus 12. A shifter 43 for aligning data stored in the 88-bit register 400 and a 64-bit register 44 for preserving data aligned by the shifter 43 are also provided.

The alignment circuit 3 is so constructed as to be able to align respective data of 8 bits, 16 bits, 32 bits and 64 bits. 64-bit data crosses a 32-bit boundary of memory space of the external memory 6 two times at most. Therefore 88 bits in total are necessary for the sizes of the 4A, 4B, 4C registers 40, 41, 42 storing non-alignment data.

FIG. 5 is a schematic diagram showing how data on the D bus 12 is taken into the 4A, 4B, 4C registers 40, 41, 42 shown in FIG. 4. The condition for the data being taken in is determined by the bus width of the external data bus 10 being used and the value of the third bit from the lower side of the address.

FIG. 6 is a block diagram showing a construction of the cache memory 4. The cache memory 4 is composed of a data registering register 50 of 256 bits, a data reading register 52, a cache memory data unit 51, a shifter 53 taking out 88 bits from 256 bits, a tag registering register 54, a cache memory tag unit 55, a tag reading register 56 and so on.

The data registered in one line of the cache memory 4 is 256 bits. External bus access for registering in the cache memory 4 is performed according to burst transfer access in which one line of data can be accessed at high speed. The data registering register 50 is composed of eight 32-bit registers 5A, 5B . . . 5H. The respective registers 5A, 5B . . . 5H are connected to the bus 12H and to the bus 12L.

FIG. 7 is a schematic diagram showing construction of a part of the memory space to be processed by the microprocessor 1 shown in FIG. 1. Addresses shown in FIG. 7 are byte addresses. The addresses shown in FIG. 7 are the lower 16 bits of 32-bit addresses and are indicated in hexadecimal.

FIG. 8 and FIG. 9 are timing charts showing timings for a burst transfer access. FIG. 8 shows the case where the external data bus 10 has a 64-bit width and FIG. 9 shows the case where it has a 32-bit width, respectively.

Burst transfer access is a transferring method in which four bus cycles are combined as a set. FIG. 8 and FIG. 9, reference symbol (a) designated clock CLK, (b) data on the external address bus A (0:31), (c) bus start signal #BS, (d) address strobe signal #AS, (e) data strobe signal #DS, and (f) designates a read/write signal R/#W respectively. All of these signals are outputted by the microprocessor 1. Preference symbol (g) designates a data-transfer completion signal #DC and (h) designates data on the external data bus D (0:63) 10. These signals are inputted to the microprocessor 1. Further, reference symbol (i) designates an access start signal indicating the start of the burst transfer access and (j) designates a bus cycle finishing signal indicating an end of each cycle of burst transfer. These signals indicate the states of the bus cycles to the internal data operation circuit 5 form the bus interface 2.

Next, an explanation will be given of the operation of such [conventional] data processor as mentioned above.

The microprocessor 1, at first, accesses the built-in cache memory 4 when data reading of the memory is necessary. In the case where a cache miss occurs, that is, where data to be accessed is not stored in the cache memory 4, the bus cycle is started to the external memory 6 to read data by a burst transfer access. When data is read after accessing the external memory 6, the alignment circuit 3 aligns the data and at the same time the data is registered in the cache memory 4. The next time accessing is performed to the same address, since data is already registered in the cache memory 4, (that is, since there is a cache hit), the time required for accessing is shortened because there is no necessity for accessing the external memory 6.

Since the microprocessor 1 has a static bus-sizing function as aforementioned, it can operate by changing the bus width of the external data bus 10.

In the following, an explanation will be given of how the operation in the cache where a cache miss occurs and data is read by a burst transfer access is different due to various bus widths of the external data bus 10 being used.

First an explanation will be given of the case where the external data bus 10 is operated with the bus width thereof being 64 bits. At the time that a cache miss occurs, a burst transfer access is started for reading data for one line of the cache. Reading data for 256 bits is performed by performing only one burst transfer access, composed of four bus cycles with the bus width of the external data bus 10 being 64 bits.

An explanation will now be given of operation for reading data using a burst transfer access in the case where the required first data 701 has addresses in the range shown in FIG. 7, (for example, the address thereof being "000A" and the data length thereof being 64 bits) and a cache miss occurs. FIG. 8 is a timing chart of the operation.

At the first cycle of burst transfer access data within the bounds of a 64-bit group, in which the first data 701 exists and whose head addresses is "0008" are accessed. In the following accesses, the remaining data within the bounds of the 256-bit group having the first data 701, are successively accessed by wrapping around. Accordingly, burst transfer access is executed in the order of addresses: "0008"→"0010"→"0018"→"0000".

The data given to the external data bus D (0:63) 10 and the D bus 12 shown in FIG. 8(h) and FIG. 8(k) are 64-bit data 801, 802, 803, 804, and 811, 812, 813, 814, respectively, starting from addresses "0008", "0010", "0018", "0000" in order.

The alignment circuit 3 is operated according to the case in FIG. 5 where there is a 64-bit data bus width, the third bit from the lower side of the address being "0". The higher 32 bits of the D bus 12, in the first cycle accessing the address "0008", are latched by the 4A register 40 of the 88 bit register 400, and the lower 32 bits thereof are latched by the 4B register 41 of the same, respectively. The higher 32 bits of the D bus 12 in the second cycle accessing the address "0010" are latched by the 4C register 42.

The bus cycle finishing signal shown in FIG. 8(j) indicates that effective data is on the D bus 12, as well as indicating one end of a bus cycle. The data is latched by registers in the alignment circuit 3 and the cache memory 4 while the signal is asserted. According to the operation, the first data 701 is held by the 4A, 4B, 4C registers 40, 41, 42 which make up the 88-bit register 400, and the 88-bit data is then aligned by the shifter 43 and latched by the register 44 to be outputted to the S bus 13.

In the cache memory 4, the data having been read by a burst transfer access is latched in order by the data registering register 50. Since the addresses to accessed is in order of "0008"→"0010"→"0018"→"0000", the higher 32 bits of the D bus 12 in the first cycle are latched by register 5C of the data registering register 50, the lower 32 bits are latched by register 5D, the higher 32 bits of the D bus 12 in the second cycle are latched by register 5E, the lower 32 bits are latched by register 5F, the higher 32 bits of the D bus 12 in the third cycle are latched by register 5G, the lower 32 bits are latched by register 5H, the higher 32 bits of the D bus 12 in the fourth cycle are latched by register 5A, and the lower 32 bits are latched by register 5B.

Since the bus cycle finishing signal shown in FIG. 8(j) indicates that effective data is on the D bus 12 as well as indicating the end of a bus cycle, the data are latched by each register while the signal is asserted.

When the fourth cycle is finished, the data is registered in the cache memory 4. Accordingly, within the bounds of data the 256-bit group including the first data 701 are registered in the cache.

In the following, an explanation will be given of operation for reading data according to a burst transfer access in the case where the second required 702 has data addresses in the range shown in FIG. 7, (for example, the address thereof being "000E" and the data length thereof being 64 bits) and a cache miss occurs. In the first cycle of the burst transfer access, data within the boundary of the 64-bit group in which the second data 702 exists and whose address is "0008" are accessed by wrapping around. This case is identical to the case where the first data 701 is read. The method for registering in the cache memory 4 is also the same. But the operation of the alignment circuit 3 is different.

The alignment circuit 3 is operated according to the case in FIG. 5 where there is a 64-bit data bus width and the third bit from the lower side of the address is "1". The lower 32 bits of the D bus 12 in the first cycle accessing the address "0008", are latched by the 4A register 40 The higher 32 bits of the D bus 12 of the second cycle accessing the address "0010" are latched by the 4B register 41, and the lower 32 bits are latched by the 4C register 42. According to this operation, the second data is held by the 4A, 4B, 4C registers 40, 41, 42 configuring the 88-bit register 400. The 88-bit data held by the data registering register 50 is aligned by the shifter 43 and then latched by the register 44 to be outputted to the S bus 13.

In the following, an explanation will be given of the case where the bus width of the external data bus 10 is 32 bits. At the time that a cache miss occurs, burst transfer accesses are started two times in order to read data for one line of the cache. Two burst transfer accesses, each composed of four bus cycles with the bus width of the external data bus 10 being 32 bits, allows a read data of 256 bits.

An explanation will next be given of the operation for reading data according to burst transfer accesses in the case where the first data required 701 has addresses in the range shown in FIG. 7 (for example, the address thereof being "000A" and the data length thereof being 64 bits), and a cache miss occurs. FIG. 9 is a timing chart showing the operation.

At the first cycle of the first burst transfer access data within the bounds of the 32-bit group, in which the remaining first data 701 exists and whose head address is "0008", are accessed. In the following accesses the remainder of data within the 128-bit group is successively accessed by wrapping around.

At the first cycle of the second burst transfer access, data within the bounds of the 32 bit group, in which the remaining first data exits and whose head address is "0010", are accessed In the following accesses, the remainder of data within the bounds of the 128 bit group are successively accessed by wrapping around.

Accordingly, the first burst transfer access is performed in the order of addresses: "0008"→"000C"→"0000"→"0004" and the second burst access is performed in the order of addresses: "0010"→"0014"→"0018"→"0001C", respectively.

The data 901 through 908 and 911–918 given to the external data bus D (0:63) 10 and D bus 12 shown in FIG. 9(h) and (k), respectively, are 32-bit data starting from "0008", "000C", "0000", "0004", "0010", "0014", "0018", and "001C". Each of the data 901–908 is on the buses 10L and 12L, i.e., the lower 32-bits of the data buses.

The alignment circuit 3 is operated according to the case in FIG. 7 where there is a 32-bit data bus width. The lower 32 bits of the D bus 12 in the first cycle of the first burst transfer access where the address "0008" is accessed, is latched by the 4A register 40. The lower 32 bits of the D bus 12 in the second cycle where the address "000C" is addressed, are latched by the 4B register 41. The lower 32 bits of the D bus 12 in the first cycle of the second burst transfer access where the address "0010" is accessed, are latched by the 4C register 42.

The bus cycle finish signal shown in FIG. 9(j) indicates that effective data is on the D bus 12, as well as indicating the end of a bus cycle. The data is latched by registers in the alignment circuit 3 and the cache memory 4 while this signal is asserted. According to this operation, the first data 701 is held by the 4A, 4B, 4C registers 40, 41, 42 which make up the 88-bit register 400. This 88-bit data is latched by the register 44 after it is aligned by the shifter 43 to be outputted to the S bus 13.

In the cache memory 4, the data read during burst transfer access is latched sequentially in the data registering register 50. Since the order of the addresses to be accessed in the first burst transfer access is "0008"→"000C"→"0000"→"0004", the lower 32 bits of the D bus 12 in the first cycle are latched by register 5C of the data registering register 50, the lower 32 bits of the D bus 12 in the second cycle are latched by register 5D, the lower 32 bits of the D bus 12 in the third cycle are latched by register 5A, and the lower 32 bits of the D bus 12 in the fourth cycle are latched by register 5B. Since the order of the addresses to be accessed in the second burst transfer access is "0010"→"0014"→"0018"→"001C" the lower 32 bits of the D bus 12 in the first cycle are latched by register 5E of the data registering register 50, the lower 32 bits of the D bus 12 in the second cycle are latched by register 5F, the lower 32 bits of the D bus 12 in the third cycle are latched by register 5G and the lower 32 bits of the D bus 12 in the fourth cycle are latched by register 5H.

The bus cycle finish signal shown in FIG. 9(j) indicates that effective data is on the D bus 12 as well as indicating an end of a bus cycle. The data is latched in the register while this signal is asserted.

When the fourth cycle of the second burst transfer access is finished, data is registered in the cache memory 4. Thus, data within the bounds of the 256-bit group, including the first data, 701 is registered in the cache.

An explanation will next be given of the operation in which data is read by a burst transfer access in the cache where required second data 702 has addresses in the range shown in FIG. 7, the address thereof being "000E" and the data length thereof being 64 bits and where a cache miss occurs.

At the first cycle of the first burst transfer access data within the bounds of the 32-bit group, in which the first data 701 exists and whose head address is "000C", is accessed. In the succeeding accesses, the remaining data within the bounds of the 128-bit group having the first data 701 are sequentially accessed by wrapping around. Accordingly, the first burst transfer access is performed in the order of addresses: "000C"→"0000"→"0004"→"0008". The second burst transfer access is the same as the case of the first data 701. Since the order of the addresses in the first transfer accessing is different, the operation at the alignment circuit 3 and the operation of registering to the cache memory 4 are also different.

The alignment circuit 3 is operated identically to the case where there is a 32-bit data bus width, shown in FIG. 5. The lower 32 bits of the D bus 12 during the first cycle of the first burst transfer access, where the address "000C" is accessed, is latched by register 4A (40). The lower 32 bits of the D bus 12 in the second cycle of the second burst transfer access where the address "0010" is accessed, is latched by register 4B (41). The lower 32 bits of the D bus 12 during the second burst transfer access where the address "0014" is accessed, is latched by register 4C (42).

In the cache memory 4, the data read by burst transfer access is sequentially latched in the data registering register 50. Since the order of the addresses to be accessed in the first transfer access is "000C"→"0000"→"0004"→"0008", the lower 32 bits of the D bus 12 during the first cycle are latched by register 5D of the data registering register 50, the lower 32 bits of the D bus 12 during the second cycle are latched by register 5A, the lower 32 bits of the D bus 12 during the third cycle are latched by register 5B, and the lower 32 bits of the D bus 12 during the fourth cycle are latched by register 5C. Since the order of the addresses to be accessed in the second burst transfer accessing is "0010"→"0014"→"0018"→"001C", the lower 32 bits of the D bus 12 during the first cycle are latched by register 5E of the data registering register 50, the lower 32 bits of the D bus 12 during the second cycle are latched by register 5F, the lower 32 bits of the D bus 12 during the third cycle are latched by register 5G, and the lower 32 bits of the D bus 12 during the fourth cycle are latched by register 5H.

When the fourth cycle of the second burst transfer access is finished, data is registered in the cache memory 4. Thus, data which is within the bounds of the 256-bit group including the second data 702 are registered in the cache.

In the [conventional] data processor, the controlling method of the internal function circuits such as alignment circuit, cache memory, and internal data operation circuit, is changed to correspond to the bus width of the external data bus (which can be changed according to the static bus-sizing function). And, as aforementioned, in order to read only the data required for registering to the cache memory, the data processor is so operated as to change the number of times burst transfer access is performed, responsive to the bus width of the external data bus. The internal data operation circuit transmits addresses to the bus interface to request accessing. The internal data operation circuit, however, so controls as to request only one access when the bus width of the external data bus to be used is 64 bits and to request two accesses when the bus width thereof is 32 bits.

Accordingly, in the [conventional] data processor, it is necessary for the internal function circuit of the microprocessor to be operated under the control of different procedures corresponding to the bus width of the external data bus indicated by the bus-sizing function. Because of this, the internal function circuit is complicated.

SUMMARY OF THE INVENTION

The present invention has been devised in order to solve such problems and the object thereof is to provide a data processor in which the internal function circuit of the microprocessor can be operated under the same control regardless of the width of the data bus.

The data processor of the invention is provided with a microprocessor, an external data bus, and an external memory connected to the microprocessor through the external data bus. The memory area has a plurality of memory boundaries defining units equal to the whole width of the bus. The data processor is further provided with a bus-sizing means which, when accessing the external memory to the microprocessor, switches between a state of using a part of the bus width of the external data bus to a state of using all of the bus width. The data processor includes accessing means for accessing a plurality of continuous bounded memory units including an address to be accessed, in the case where data at the optional position on the external memory is accessed. The data processor includes address generating means for generating a head address of the bounded memory unit including the address on the basis of the address to be accessed, and with a bus interface circuit for continuously accessing, in order, the data within the bounds of a memory area from the head address generated by the address generating means.

In addition to the aforesaid configuration, the data processor of the invention is provided with an internal data bus having, inside the microprocessor, the same bit width as the external data bus and into which data is inputted from the external data bus, and with a register of the same bit width as the bus width except the minimum which can be designated by the bus-sizing means. The data processor is so constructed that the bus interface circuit outputs the data on the external data bus directly to the internal data bus at every access in the case where the external memory is continuously accessed using the whole bus width of the external data bus. The data processor stores data from the external data bus into the register at every access in the case where the external memory is continuously accessed using a part of the bus width of the external data bus. In next access, the data processor outputs the data from the external data bus to the corresponding bit position of the internal data bus (in the case where the register is filled with data) as well as outputs the data stored in the register to the corresponding bit position of the internal data bus.

Further, the data processor of the invention comprises a microprocessor, an external data bus, and an external memory connected to the microprocessor through the external data bus and is provided, in the microprocessor, with bus-sizing means which switches between a state using a part of the bus width of the external data bus in accessing the external memory to and a state using the whole bus width. The data processor includes accessing means for accessing the external memory continuously by processing a predetermined number of accesses of the external bus as a set, and a bus interface circuit starting an external bus access to the external memory by receiving a request for an access start in the case where an access start is requested. The bus interface circuit is so composed as to access the memory area corresponding to the external memory. The means for accessing generates a set of continuous external bus accesses in the case where the whole bus width of the external data bus is used to request an access start, and to access successively the memory area in the case where the whole bus width of the external data bus is used, by generating a plurality of continuous external bus accesses responsive to the bus width to be used. The means for accessing generates an address for the first external bus access of the external bus accesses of each set in the case where a part of the bus width of the external data bus is used, thereby starting continuous external bus accesses of each set.

In the data processor of the invention, a plurality of continuous bounded areas of memory are accessed by the accessing means from the bounded memory area including an address to be accessed (in the case where data on an optional position of the external memory is accessed), and at this time, a head address of the memory boundary including the address is generated by the address generating means on the basis of the address to be accessed. From the head address generated by the address generating means, the remainder of the data within the bounded memory area is successively accessed by the bus interface circuit.

And in the data processor of the invention, the data inputted form the external data bus is stored in the register in the case where only a part of bus width of the external data bus is used. The data inputted from the external data bus is outputted intact to the internal data bus in the case where the data stored in this register and the data inputted from the external data bus are outputted to the internal data bus and the whole width of the external data bus is used.

Further, in the data processor of the invention, the memory area corresponding to the external memory is accessed by generating a set of continuous external bus accesses in the case where accessing is performed by using the whole bus width of the external data bus in response to a request for an access start by the bus interface circuit. The memory area in the case where the whole bus width of the external data bus is used, is successively accessed by generating a plurality of continuous external bus accesses corresponding to the bus width to be used. In the case where a part of the bus width of the external data bus is used, the memory area is accessed by generating an address for the first external bus access of the continuous external bus accesses of each set, thereby starting the continuous external bus accesses of each set.

The above and further objects and features of the invention will more fully be apparent from the following detailed description with accompanying drawings.

BRIEF DESCRIPTION OF THE DRAWINGS

FIG. 3 is a schematic diagram showing logical levels of a control signal for a tri-state buffer of a data transfer system of a bus interface at the time of reading data.

FIG. 5 is a schematic diagram showing how data on D bus is taken into registers 4A, 4B and 4C of an alignment circuit shown in FIG. 4.

DESCRIPTION OF THE PREFERRED EMBODIMENTS

In the following, an explanation will be given of the invention, referring to drawings showing embodiments thereof. In addition, in each drawing which is referred to when explanation is made on the present invention, the same reference symbols as in each drawing of the aforesaid conventional example show either the same or corresponding parts.

Figure 1:
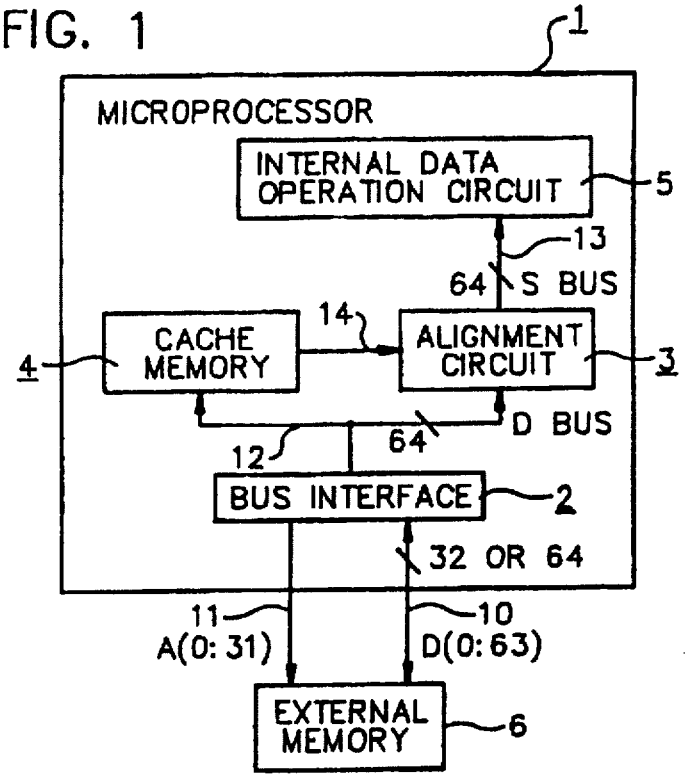
FIG. 1 is a block diagram showing a configuration of a data processor [of conventional design, also] applicable to the present invention.
Figures 10, 11:
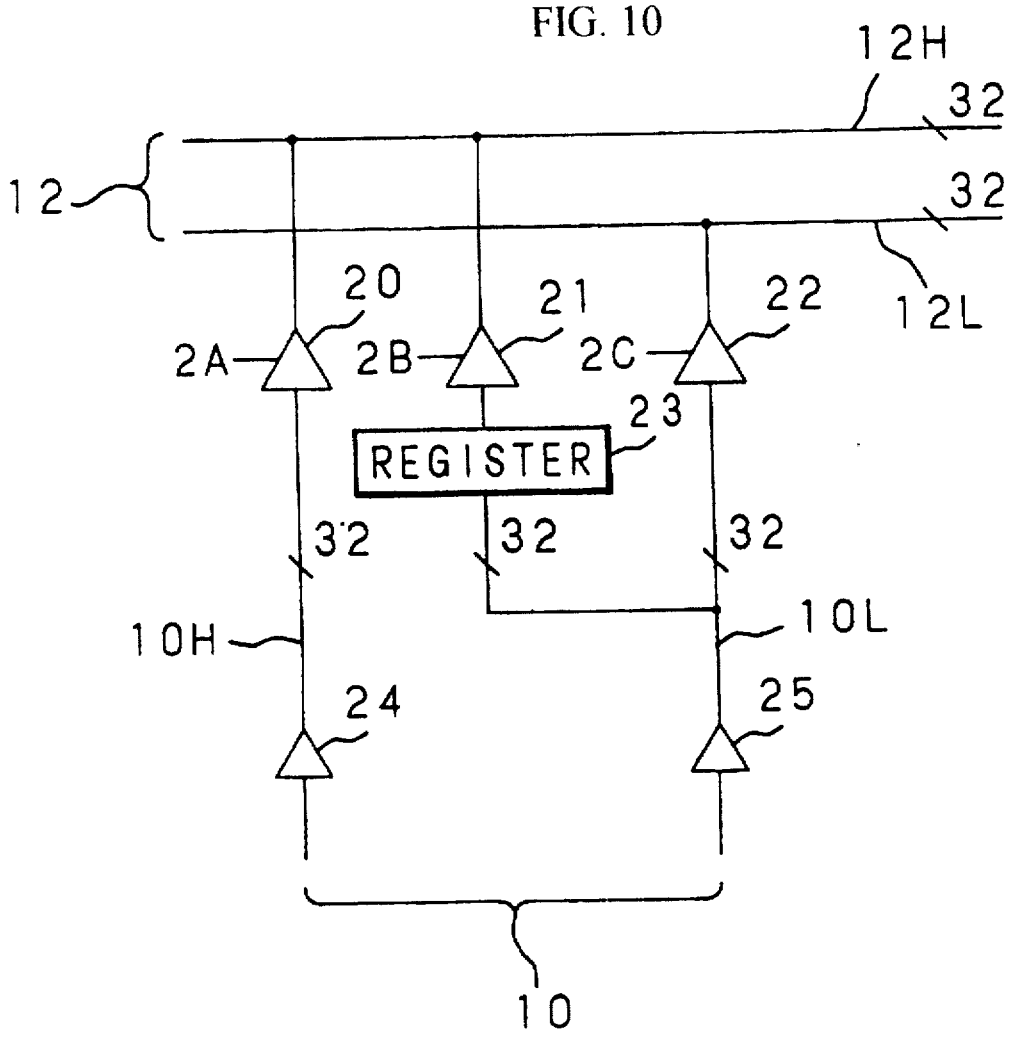
FIG. 10 is a circuit diagram showing a configuration of a circuit for a data transfer system of a bus interface of a data processor according to the present invention.
FIG. 11 is a schematic diagram showing logical levels of a tri-state buffer control signal of a circuit for a data transfer system of a bus interface at the time of reading data.

FIG. 1 is a block diagram showing an example of a configuration of the data processor of the present invention, and it shows a same configuration as the conventional data processor including the fact that it has a bus-sizing function except that the circuit for data transfer of the bus interface 2 is as shown in FIG. 10.

The data processor of the invention is composed of a microprocessor 1 and an external memory 6 connected with the microprocessor 1 by the external data bus 10 and the external address bus 11. Though the bus width of the external data bus D (0:63) 10 is 64 bits, it has a static bus-sizing function which can designate the bus width of the external data bus 10 as either 64-bit width or 32-bit width. When the external data bus is used in a 32-bit configuration, only the lower 32 bits D (32:63) of the external data bus 10 is used for access. The bus width of the external address bus A (0:31) 11 is fixed to a 32-bit width.

The microprocessor 1 is composed of the bus interface 2 and the internal function circuit. The internal function circuit, includes the alignment circuit 3, cache memory 4, internal data operation circuit 5 and so on. Both the alignment circuit 3 and the cache memory 4 are connected to the bus interface 2 by the D bus 12 which is an internal data bus. The alignment circuit 3 and the internal data operation circuit 5 are connected by the S bus 13. The cache memory 4 and the alignment circuit 3 are connected by bus 14.

FIG. 10 is a circuit diagram showing a configuration of the circuit for the data transfer system of the bus interface 2. This circuit is composed of tri-state buffers 20, 21, 22 and 32-bit register 23, and buffers 24, 25. A bus 10H (which is the higher 32 bits of the external data bus 10) is connected to a bus 12H (which is the higher 32 bits of the D bus 12) through the buffer 24 and the tri-state buffer 20, and a bus 10L (which is the lower 32 bits of the external data bus 10) is connected to a bus 12L (which is the lower 32 bits of the D bus 12) through the buffer 25 and tri-state buffer 22. In addition, the output of the buffer 25 is also connected to the register 23, and the output of this register 23 is connected to the bus 12H through the tri-state buffer 21.

Figure 4:
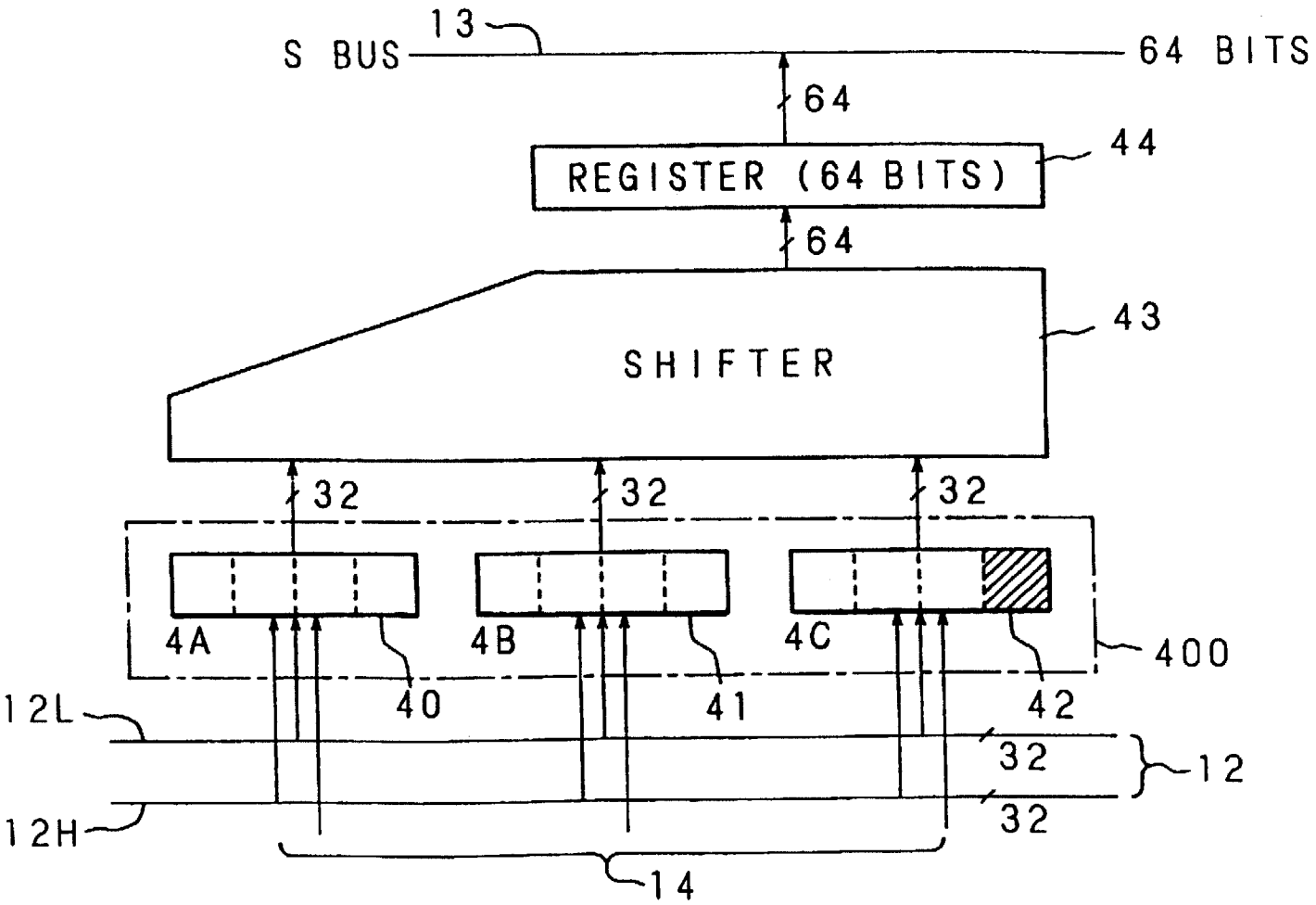
FIG. 4 is a block diagram showing a configuration of an alignment circuit of a data processor [of conventional design and also] applicable to the present invention.
Figure 6:
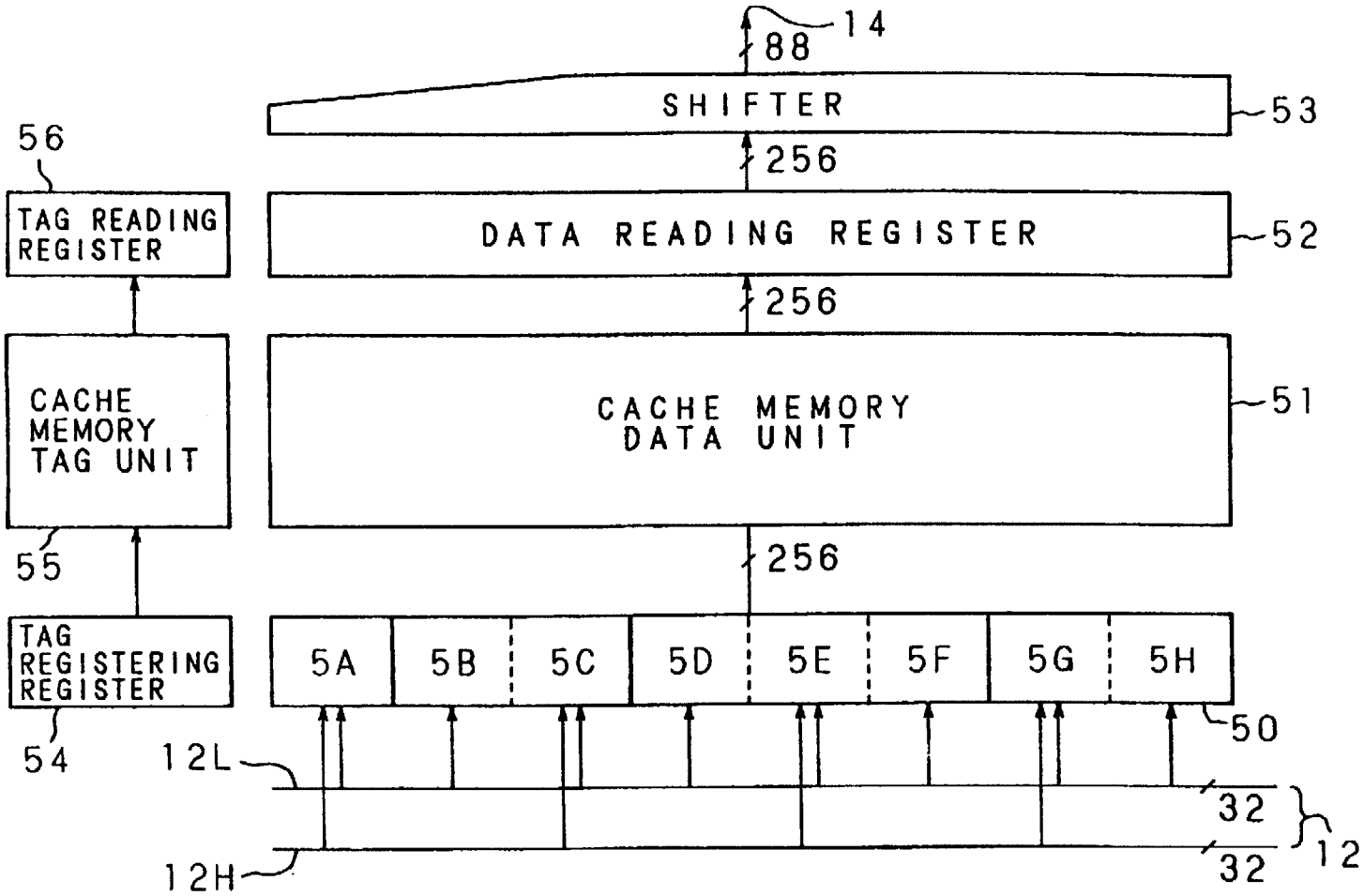
FIG. 6 is a block diagram showing a configuration of a cache memory of a data processor [of conventional design and also] applicable to the present invention.

The configurations of the alignment circuit 3 and the cache memory 4 are the same as those of [conventional] design shown in FIG. 4 and FIG. 6, respectively.

In FIG. 11, logical levels of the control signals 2A, 2B, 2C of the tri-state buffers 20, 21, 22 in reading data are shown. The control signals 2A, 2B, 2C are changed responsive to the bus width of the external data bus 10. In the case where the external data bus 10 has a 64-bit bus width, the higher 32 bits of the external data bus 10 are outputted to the higher 32 bits of the D bus 12, and the lower 32 bits of the external data bus 10 are outputted to the lower 32 bits of the D bus 12. In the case where the external data bus 10 has a 32-bit bus width, data of the register 23 is outputted to the higher 32 bits of the D bus 12 and the lower 32 bits of the external data bus 10 is outputted to the lower 32 bits of the D bus 12.

Figure 7:
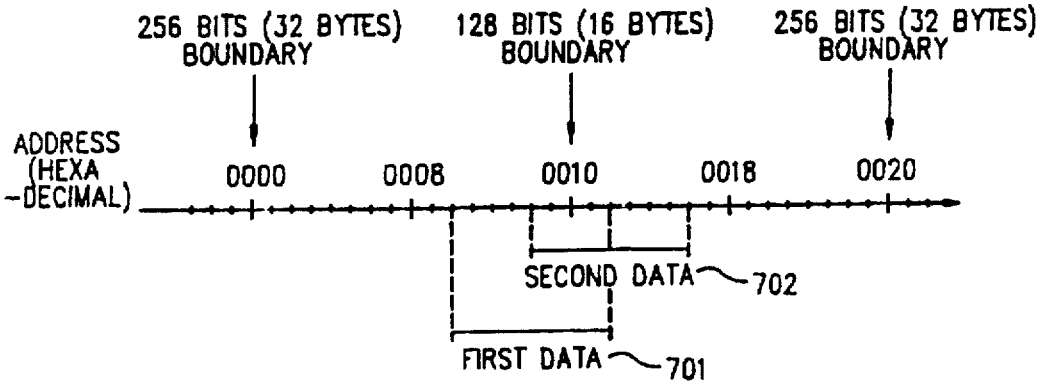
FIG. 7 is a schematic diagram showing a configuration of a part of a memory space.

FIG. 7 is a schematic diagram showing a configuration of a part of the memory space of the external memory 6, being the same as that of the [conventional] example. Addresses shown in FIG. 7 are byte addresses, and what is shown here are the lower 16 bits of 32 bits addresses. These are shown as hexadecimal numbers.

Figure 8:
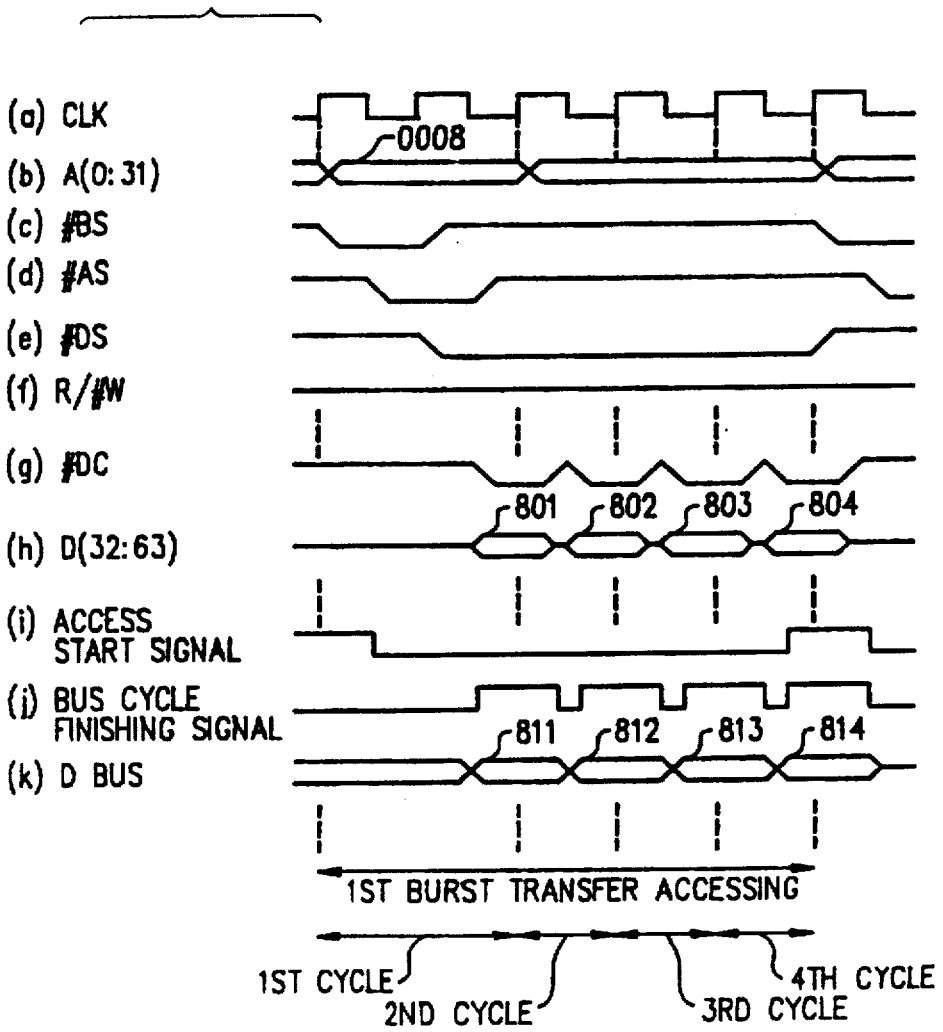
FIG. 8 is a timing chart showing timing for a burst transfer access in the case where the data bus has a 64-bit width in a data processor [of conventional design and also] applicable to the present invention.
Figure 9:
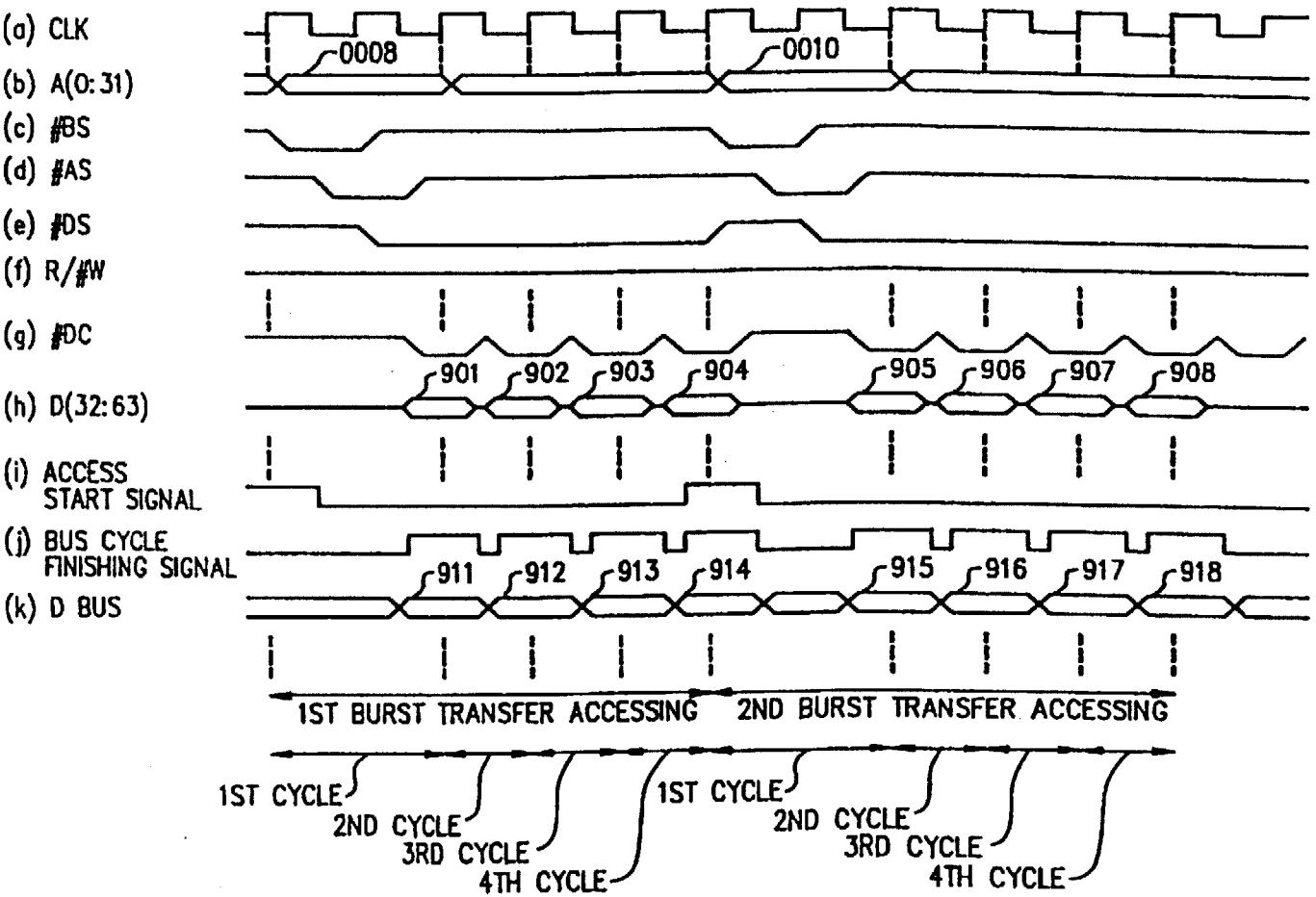
FIG. 9 is a timing chart showing timing for a burst transfer access in the case where the data bus has a 32-bit width in a [conventional] data processor.
Figure 12:
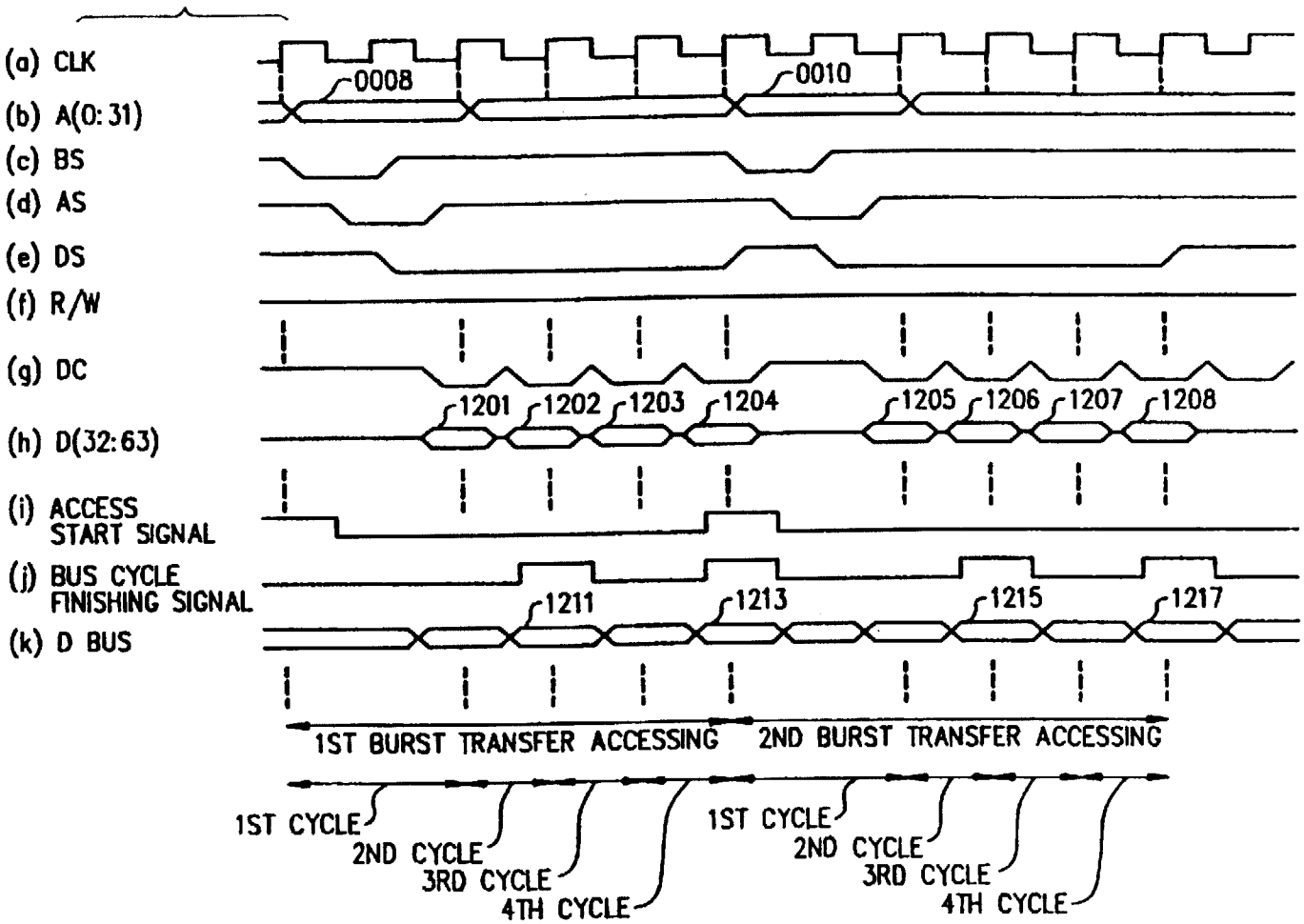
FIG. 12 is a timing chart showing timing for a burst transfer access in the case where the data bus has a 32-bit width in a data processor according to the present invention.

FIG. 8 and FIG. 12 are timing charts showing timing for a burst transfer access. FIG. 8 shows the case where the external data bus 10 has 64-bit width, being the same as the case of 32-bit bus width. FIG. 12 shows the case of 32-bits bus width.

Next, an explanation will be given of the operation of the data processor of the invention, referring to the drawings.

The microprocessor 1 accesses the built-in cache memory 4 when it is necessary to read data to a memory. When a cache miss occurs, that is, when the data to be accessed is not stored in the cache memory 4 in advance, a bus cycle is stored to the external memory 6. Data is then read according to a burst transfer access. When the external memory is accessed to read data, the alignment circuit 3 aligns the data, and at the same time the data is registered in the cache memory 4. The next time the same address is accessed, since the data already exists in the cache memory 4 (i.e., there is a cache hit), the time required for accessing is shortened.

The data processor of the invention can be operated even when the bus width of the external data bus 10 is changed since it has a static bus-sizing function.

An explanation will be given, in the following, of how operation in the case where a cache miss occurs and data is read according to a burst transfer access due to various bus widths of the external data bus 10 being used.

At first, the case where the external data bus 10 has a 64-bit bus width is almost the same as that of the conventional example.

Figure 2:
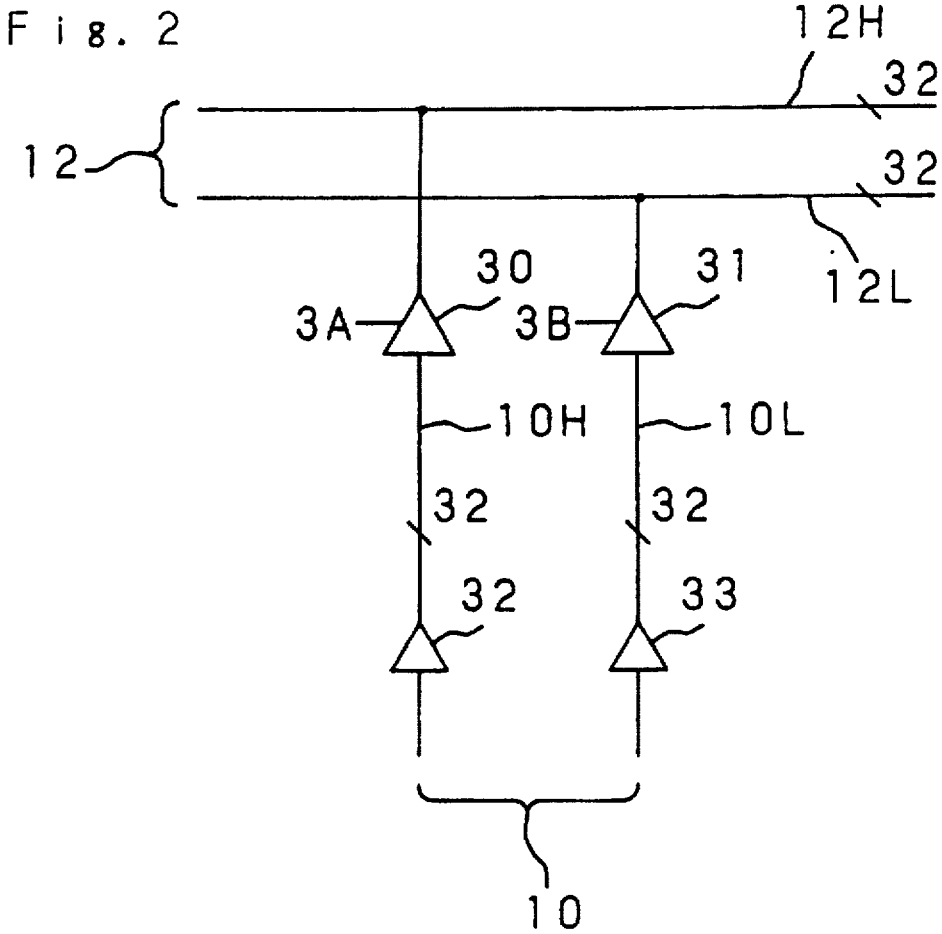
FIG. 2 is a circuit diagram showing a configuration of a circuit for a data transfer system of a bus interface of a [conventional] data processor.

The circuit for the data transfer system of the bus interface 2 of the invention (shown in FIG. 10), in the case where the external data bus 10 has a 64-bit bus width, outputs the higher 32 bits of the external data bus 10 to the higher 32 bits of the D bus 12, and the lower 32 bits of the external data bus 10 to the lower 32 bits of the D bus 12, respectively. Accordingly, the operation thereof is same as that of the circuit for the data transferring system of the [conventional] data bus interface 2 shown in FIG. 2.

A request for an access start to the first data of the address in the range shown in FIG. 7 is provided to the bus interface 2 by the internal data operation circuit 5 only one time. At this time, the head address "000A" of the first data 701 is sent to the bus interface 2. Judging from the fact that the external data bus 10 has a 64-bit bus width, the bus interface 2 starts one block transfer access.

The bus cycle finish signal shown in FIG. 8(j) indicated in the present invention, is not an end of a bus cycle but indicates that there is effective data on the D bus 12. But in the case where the external data bus 10 has a 64-bit bus width, it coincides with the end of a bus cycle.

Next, an explanation will be given of the case where the external data bus 10 has a 32-bit bus width. At the time of a cache miss, two instances of burst transfer accesses are started for reading data for one line of the cache. When the bus width of the external data bus 10 is 32 bits, 256 bits of data can be read using two instances of burst transfer access, each composed of a set of four bus cycles.

An explanation will next be given of the case where data is read according to a burst transfer access, where the required first data 701 has addresses in the range shown in FIG. 7, the address thereof being "000A" and the data length thereof being 64 bits, and when a cache miss occurs. FIG. 12 is a timing chart showing this operation.

A request for an access start to the first data 701 is provided to the bus interface 2 only one time by the internal data operation circuit 5. At this time, the head address "000A" of the first data 701 is sent to the bus interface 2. Judging from the fact that the external data bus 10 has a 32-bit bus width, the bus interface 2 automatically starts two instances of block transfer access in response to one request for an access start from the internal data operation circuit 5. The bus interface 2 also generates automatically a head address of the second burst transferring access. The first burst transfer access starts from the address ""000A" and the second burst transfer access starts from address "0010".

At the first cycle of the first burst transfer access data within the bounds of the 32-bit group in which the first data 701 exists and whose head address is "0008", is accessed. In the successive accesses, the remaining data within the bounds of the 128-bit group having the first data 701 are accessed successively by wrapping around. At the first cycle of the second burst transfer access data within the bounds of the 32-bit group, in which the remaining first data 701 is exists and whose head address is "0010", is accessed. In the successive accesses, the remaining data within the bounds of the 128-bit group having the first data 701 is successively accessed by wrapping around.

Accordingly, in the first burst transfer access, accessing is performed in the order of addresses. "0008"→"000C"→"0000"→"0004". In the second burst transfer access, accessing is performed in the order of addresses: "0010"→"0014"→"0018"→"001C", respectively.

In the case where the external data bus 10 has a 32-bit bus width, the circuit for the data transfer system of the interface 2 of the invention (shown in FIG. 10) outputs the data in register 23 to the higher 32 bits of the D bus 12 and outputs the lower 32 bits of the external data bus 10 to the lower 32 bits of the D bus 12. The data having been read at an odd-numbered cycle of the burst transfer access is latched in register 23. At even-numbered cycles of the burst transfer access, since the data on the register 23 is outputted to the higher 32 bits of the D bus 12 and the lower 32 bits of the external data bus 10 is outputted to the lower 32 bits of the D bus 12, respectively, the data having been read at odd-numbered cycles immediately before the even-numbered cycles and the data having been read at an even-numbered cycle make up 64 bits to be outputted to the D bus 12.

Data 1201 through 1208 given to the external data bus D (32:63) 10 shown in FIG. 12(h) is 32-bit data starting from "0008", "000C", "0000", "0004", "0010", "0014", "0018", and "001C" in order. The data is on the lower 32 bits of the external data bus 10.

The data 1211, 1213, 1215, 1217 given to the D bus 12 shown in FIG. 12(K) are 64-bit data starting from "0008", "0000", "0010", and "0018" in order, that is, concatenated data of above-mentioned data 1201 and 1202, data 1203 and 1204, data 1205 and 1206, and data 1207 and 1208, respectively.

The bus cycle finish signal in the microprocessor 1 shown in FIG. 12(j) indicates not the end of a bus cycle but also indicates that effective data is on the D bus 12.

Accordingly, the data is latched to registers of the alignment circuit 3 and the cache memory 4 while this signal is asserted.

From the viewpoint of the alignment circuit 3 and the cache memory 4, the fact that two burst transfer accesses have been performed is not recognized, and the operations of the alignment circuit 3 and cache memory 4 are the same as the case where 64-bit data is read in the order of addresses: "0008"→"0000"→"0010"→"0018". Where the external data bus 10 has a 32-bit bus width, even though sometimes there may be a case where an address does not wrap around, there is no problem since the alignment circuit 3 and the cache memory 4 latched data to each register after seeing an address from the 32-nd bit from the lower side to 5-th bit.

The alignment circuit 3 is operated according to the case, shown in FIG. 5, where there is a 64-bit data bus width, and the third bit from the lower side is "0". The operation of the microprocessor 1 is only different according to a value of the 3rd bit from the lower side of an address, since the alignment circuit 3 is capable of operating regardless of the bus width of the external data bus 10. The higher 32 bits on the D bus 12 when the first bus cycle finish signal is effective, (being equivalent to the case where 64 bits are accessed from address "0008"), are latched to the 4A register 40 and the lower 32 bits are latched to the 4B register 41, respectively. The higher 32 bits on the D bus 12 when the third bus cycle finish signal is effective, being equivalent to the case where 64 bits are accessed from address "0010", are latched to the 4C register 42. According to the operation, the first data 701 is stored in the 4A, 4B, 4C registers 40, 41, 42 making up the 88-bit register 400, respectively. The 88-bit data is aligned by the shifter 43 and latched to the register 44 to be outputted to the S bus 13.

In the cache memory 4, the data having been read according to a burst transfer access is successively latched in the data registering register 50. Since the case where addresses are in the order: ("0008"→"0000"→"0010"→"0018" is equivalent to the case where data is read 64 bits at a time, the higher 32 bits on the D bus 12 when the first bus cycle finish signal is effective, (being equivalent to the case where 64 bits are accessed from address "0008"), are latched by register 5C of the data registering register 50, and the lower 32 bits are latched by register 5D. The higher 32 bits on the D bus 12 when the second bus cycle finish signal is effective, (being equivalent to the case where 64 bits are accessed from address "0000"), are latched by register 5A, and the lower 32 bits are latched by register 5B. The higher 32 bits on the D bus 12 when the third bus cycle finish signal is effective, (being equivalent to the case where 64 bits are accessed from address "0010"), are latched by register 5E, and the lower 32 bits are latched by register 5F. The higher 32 bits on the D bus 12 when the fourth bus cycle finish signal is effective, (being equal to the case where 64 bits are accessed from address "0018") are latched by register 5G, and the lower 32 bits are latched by register 5H.

When the fourth bus cycle finish signal becomes effective and all the accesses are finished, data is registered in the cache memory 4. Thus, 256 bits of data including the first data 701 is registered in the cache.

An explanation will now be given of operations in the case where data is read according to a burst transfer access, where second data 702 having addresses in the range shown in FIG. 7, (here the address thereof being "000E" and the data length thereof being 64 bits) is required and a cache miss occurs.

A request for an access start to the second data 702 is provided to the bus interface 2 only one time by the internal data operation circuit S. At this time, the head address "000E" of the second data 702 is sent to the bus interface 2. Judging from the fact that the internal data bus 10 has a 32-bit bus width, the bus interface 2 automatically starts two instances of burst transfer access in response to one request for an access start from the internal data operation circuit 5. The bus interface 2 also generates a head address of the second burst transfer access automatically. The first burst transfer access starts from address "000E" and the second burst transfer accessing starts from address "0010".

At the first cycle of the first burst transfer access 32 bits are accessed from the head address "0008" of the 64-bit group at which the data 702 exists. In the successive accesses, the remaining of data within the bounds of the 128-bit group having the second data 702 is successively accessed by wrapping around.

At the first cycle of the second burst transfer access, 32 bits where the remaining data 701 exists and whose head address is "0010", are accessed. In the successive accesses remaining within the bounds of the 128-bit group having the first data 701 is successively accessed by wrapping around.

Accordingly, the addresses are accessed in the order: "0008"→"000C"→"0000"→"0004", and in the second burst transfer access, the addresses are accessed in the order: "0010"→"0014"→"0018"→"001C", respectively.

From the viewpoint of the alignment circuit 3 and the cache memory 4, the fact that two burst transfer accesses are carried out is not recognized, and the operations of the alignment circuit. 3 and cache memory 4 are the same as the case where 64-bit data is read in the order: "0008"→"0000"→"0010"→"0018".

The alignment circuit 3 is operated according to the case, shown in FIG. 5, where there is a 64-bit data bus width and the third bit from the lower side of the addresses is "1". In the present invention, since the alignment circuit 3 is capable of operating regardless of the bus of the external data bus 10, the operation is only different according to the value of the third bit from the lower side of an address. The lower 32 bits on the D bus 12 when the first bus cycle finish signal is effective, (being equivalent to the case where 64 bits are accessed from address "0008"), is latched to the 4A register 40. The higher 32 bits on the D bus 12 when the third bus cycle finish signal becomes effective, (being equivalent to the case where 64 bits are accessed from address "0010"), is latched to the 4B register 41, and the lower 32 bits are latched to the 4C register 42. According to this operation, the second data 702 is stored in the A4. 4B, 4C registers 40, 41, 42 which make up the 88-bit register 400. The 88-bit data is aligned by the shifter 43 and latched to the register 44, to be outputted to the S bus 13.

The operation of the cache memory 4 in the case where the second data 702 is accessed becomes identical to that in the case where the first data 701 is accessed.

In the embodiment as aforementioned, in bus accessing by using a part of a bus width of an external data bus according to a bus-sizing function, there is provided a bus interface with a register for storing data successively inputted from the external data bus and for aligning data for the bus width of the external data bus, a circuit for generating a signal which indicates that the data aligned by using the register is being outputted on the internal data bus, and a circuit capable of performing an access request of one data bus, starting bus accessing after dividing a bus cycle in two, according to the bus width and by accessing an amount of data which can be input or output with an access which uses all of the external data bus.

In the aforementioned embodiment, a protocol is provided for transmitting/receiving a request for an access start from internal function circuits to a bus interface, or transmitting/receiving data, bus cycle signals and so on from the bus interface to the internal function circuits, wherein the case where a part of the external data bus is used, can be equivalent to the case where the whole of the external data bus is used.

As described in the above, according to the data processor of the invention, since a protocol for transmitting/receiving data and signal between a bus interface and internal function circuits are constructed so that it can be controlled with same protocol regardless of the bus width of the external data bus, the constructions of the internal function circuit and its control circuit can be simplified.

As this invention may be embodied in several forms without departing from the spirit of essential characteristics thereof, the present embodiment is therefore illustrative and not restrictive, since the scope of the invention is defined by the appended claims rather than by description preceding them, and all changes that fall within the meets and bounds of the claims, or equivalents of such meets and bounds thereof are therefore intended to be embraced by the claim.

What is claimed is:

1. A data processor comprising a microprocessor, an external data bus having a variable n-byte width, wherein n is an even integer and an external memory which is connected with said microprocessor through said external data bus and whose memory area is composed of a plurality of memory boundaries defined by n-bytes as one unit, wherein said microprocessor is provided with:

bus-size switching means for switching between a first case of using said external data bus in n-bytes width and a second case of using said external data bus in n/2 byte width when accessing said external memory;

accessing means for, in said first case, successively accessing m memory boundaries, wherein m is an even integer, including a memory boundary where an address to be accessed exists by wrapping around from said memory boundary where an address to be accessed exists, and in said second case, successively accessing m/2 memory boundaries including a memory boundary where an address to be accessed exists by wrapping around from said memory boundary where an address to be accessed exists;

address generating means for generating a head address of said memory boundary of n-byte units, said n-byte units including said address to be accessed; and a bus interface circuit for accessing successively the inside of said memory area in an order from the head address of addresses generated by said address generating means.

2. A data processor as set forth in claim 1, wherein said microprocessor is further provided with:

an internal data bus having n-byte width and to which data is inputted from said external data bus, and a register having n-byte width which connects said external data bus with said internal data bus, and said bus interface circuit, when said external memory is successively accessed by using the entire n-byte bus width of said external data bus, outputs data of n-bytes on said external data bus directly to said internal data bus at every access, in the absence of using said register and when said external memory is successively accessed by using n/2 byte bus width of said external data bus, stores data of n/2 bytes from said external data bus into said register at every time of accessing, and outputs data of n/2 bytes stored in said register to bit positions corresponding to said internal data bus and outputs data of n-bytes on said internal data bus by outputting data of n/2 bytes to bit positions corresponding to said internal data bus from said external data bus at every even numbered access.

3. The data processor of claim 1 where n=8 and m=4.

4. A data processor comprising a microprocessor, an external data bus having a bus width, and an external memory which is connected with said microprocessor, wherein said microprocessor is provided with:

bus-sizing means for switching between a state of using a part of the bus width of said external data bus and a state of using all of said bus width for accessing said external memory;

accessing means for accessing said external memory successively by executing a predetermined number of external bus accesses as a set, and a bus interface circuit for, receiving a request for an access start and starting an external bus access to said external memory; and wherein said bus interface circuit, in response to a single request for an access start when all of said bus width of said external data bus is used, generates a single set of successive external bus accesses, and when a part of the bus width of the external data bus is used, generates a plurality of sets of successive external bus accesses, starts each set of successive external bus accessing by generating addresses for the first external bus access of each set of successive external bus accesses, and accesses successively a memory area of the same size as in the case where all of said bus width of said external data bus is used.

5. A method for accessing memory in a data processor, said data processor having a microprocessor, means for storing a block of data, an external data bus having an effective bus width selectable between n-bytes and n/2 bytes, wherein n is an even integer and an external memory which is connected to said microprocessor through said external data bus, said external memory having a plurality of addressable memory locations each having a width of n-bytes, the method comprising the steps of:

selecting whether said effective bus width of said external data bus is to be n-bytes or n/2 bytes;

generating, in said microprocessor, an access request to access a specific addressable memory location in said external memory;

generating, in an address generating circuit, a head address of a block of data to be accessed, wherein said head address is generated based on said specific addressable memory location;

accessing said external memory, wherein said accessing is accomplished in a series of accesses sufficient to retrieve a block of data;

generating a bus transfer finishing signal upon completion of each of said series of accesses;

transferring said block of data through an internal data bus, said internal data bus having a bus width equal to n-bytes;

storing said block of data, wherein said storing is accomplished in a certain order if said external bus width is n-bytes, and is accomplished in the same order if said external bus width is n/2 bytes;

transferring said block of data to said means for storing.

6. The method of claim 5, wherein said step of transferring said block of data [to said alignment register] *through said internal bus* further comprises providing an n/2-byte wide register between said external data bus and said internal data bus.

7. The method of claim 6, wherein said external data bus is selected to be n-bytes wide, wherein said step of transferring said block of data [to an alignment register] *through said internal bus* further comprises the step of:

passing data from said external bus directly to said internal bus without passing through said n/2-byte wide register.

8. The method of claim 6, wherein said external data bus is selected to be n/2 bytes wide, wherein said step of transferring said block of data [to an alignment register] *through said internal bus* further comprises the step of:

passing n/2 bytes of data from said external data bus to said n/2-byte register in each of said series of transfers;

passing n-bytes of data [to said alignment register] *through said internal bus* in every even-numbered transfer of said series of transfers.

9. The method of claim 5 wherein said means for storing is a cache.

10. The method of claim 5 wherein said step of transferring said block of data through an internal data bus further comprises the step of transferring said block of data to an alignment register.

11. A method, for accessing memory in a data processor, said data processor having a microprocessor, means for storing a block of data, an external data bus having an effective bus width selectable between n-bytes and n/2 bytes, wherein said n is 8 and wherein said block of data is 256 bits wide said data processor having an external memory which is connected to said microprocessor through said external data bus, said external memory having a plurality of addressable memory locations each having a width of n-bytes, the method comprising the steps of:

selecting whether said effective bus width of said external data bus is to be n-bytes of n/2 bytes;

generating, in said microprocessor, an access request to access a specific addressable memory location in said external memory;

generating, in an address generating circuit, a head address of a block of data to be accessed, wherein said head address is generated based on said specific addressable memory location;

accessing said external memory, wherein said accessing is accomplished in a series of accesses sufficient to retrieve a block of data;

generating a bus transfer finishing signal upon completion of each or said series of accesses;

transferring said block of data through an internal data bus, said internal data bus having a bus width equal to n-bytes;

storing said block of data, wherein said storing is accomplished in a certain order if said external bus width is n-bytes, and is accomplished in the same order if said external bus width is n/2 bytes;

transferring said block of data to said means for storing.

12. The method of claim 11 wherein said means for storing is a cache.

13. The method of claim 11 wherein said step of transferring said block of data through an internal data bus further comprises the step of transferring said block of data to an alignment register.

*14. A data processor comprising a microprocessor, an external data bus having a variable n-byte width, wherein n is an even integer, and an external memory which is connected to said microprocessor through said external data bus and whose memory area is composed of a plurality of memory boundaries defined by at least one addressable memory location as one unit, wherein said data processor is provided with;*

*bus-size switching means for switching between a first case of using said external data bus in n-bytes width and a second case of using said external bus in n/2 byte width when accessing said external memory;*

*accessing means for, in said first case, successively accessing a plurality of memory boundaries, including a memory boundary where an address to be accessed exists by wrapping around from said memory boundary where an address to be accessed exists, and successively providing n-byte units derived therefrom to said external bus, and in said second case, successively accessing a plurality of memory boundaries including a memory boundary where an address to be accessed exists by wrapping around from said memory boundary where an address to be accessed exists, and successively providing n/2-byte units derived therefrom to said external bus;*

*address generating means for generating a head address of said memory boundary where said address to be accessed exists; and*

*a bus interface circuit for accessing successively the inside of said memory area in an order from the head address of addresses generated by said address generating means.*

*15. A data processor comprising a microprocessor, an external data bus having a variable n-byte width, wherein n is an even integer and an external memory which is connected to said microprocessor through said external data bus and whose memory area is composed of a plurality of memory boundaries defined by at least one addressable memory location as one unit, wherein said data processor is provided with;*

*bus-size switching circuitry for switching between a first case of using said external data bus in n-bytes width and a second case of using said external bus in n/2 byte width when accessing said external memory;*

*accessing circuitry for, in said first case, successively accessing a plurality of memory boundaries, including a memory boundary where an address to be accessed exists by wrapping around from said memory boundary where an address to be accessed exists, and successively providing n-byte units derived therefrom to said external bus, and in said second case, successively accessing a plurality of memory boundaries including a memory boundary where an address to be accessed exists by wrapping around from said memory boundary where an address to be accessed exists, and successively providing n/2-byte units derived therefrom to said external bus;*

*address generating circuitry for generating a head address of said memory boundary where said address to be accessed exists; and*

*a bus interface circuit for accessing successively the inside of said memory area in an order from the head address of addresses generated by said address generating means.*

*16. A data processor comprising a microprocessor, an external data bus having a variable n-byte width, wherein n is an even integer and an external memory which is connected to said microprocessor through said external data bus and whose memory area is composed of a plurality of n-byte memory boundaries defined by n-bytes as one unit, each of said n-byte units having an upper half and a lower half, wherein said data processor is provided with;*

*bus-size switching means for switching between a first case of using said external data bus in n-bytes width and a second case of using said external bus in n/2 byte width when accessing said external memory;*

*accessing means for, in said first case, successively accessing a plurality of memory boundaries, including a memory boundary where an address to be accessed exists, by wrapping around from said memory boundary where an address to be accessed exists, and successively providing n-byte units derived therefrom to said external bus, and in said second case, successively accessing a plurality of memory boundaries, including a memory boundary where an address to be accessed exists, by wrapping around from said memory boundary where an address to be accessed exists, and successively providing n/2-byte units derived therefrom to said external bus;*

*address generating means for generating a head address of said memory boundary where said address to be accessed exists, which head address is on an n-byte memory boundary, both in the case in which the address to be accessed is within the upper half of the n-byte unit beginning at said memory boundary, and the case in which the address to be accessed is within the lower half of said n-byte unit; and*

*a bus interface circuit for accessing successively the inside of said memory area in an order from the head address of addresses generated by said address generating means.*

*17. A data processor comprising a microprocessor, an external data bus having a variable n-byte width, wherein n is an even integer, and an external memory which is connected to said microprocessor through said external data bus and whose memory area is composed of a plurality of n-byte memory boundaries defined by n-bytes as one unit, each of said n-byte units having an upper half and a lower half, wherein said data processor is provided with:*

*bus-size switching circuitry for switching between a first case of using said external data bus in n-bytes width*

*and a second case of using said external bus in n/2 byte width when accessing said external memory;*

*accessing circuitry for, in said first case, successively accessing a plurality of memory boundaries, including a memory boundary where an address to be accessed exists, by wrapping around from said memory boundary where an address to be accessed exists, and successively providing n-byte units derived therefrom to said external bus, and in said second case, successively accessing a plurality of memory boundaries, including a memory boundary where an address to be accessed exists, by wrapping around from said memory boundary where an address to be accessed exists, and successively providing n/2-byte units derived therefrom to said external bus;*

*address generating circuitry for generating a head address of said memory boundary where said address to be accessed exists, which head address is on an n-byte memory boundary, both in the case in which the address to be accessed is within the upper half of the n-byte unit beginning at said memory boundary, and the case in which the address to be accessed is within the lower half of said n-byte unit; and*

*a bus interface circuit for accessing successively the inside of said memory area in an order from the head address of addresses generated by said address generating circuitry.*

*18. A data processor comprising a microprocessor, an external data bus having a variable n-byte width, wherein n is an even integer, and an external memory which is connected to said microprocessor through said external data bus and whose memory area is composed of a plurality of memory boundaries defined by n-bytes as one unit, each of said n-byte units having an upper half and a lower half, wherein said data processor is provided with:*

*bus-size switching circuitry for switching between first case of using said external data bus in n-bytes width and a second case of using said external bus in n/2 byte width when accessing said external memory;*

*accessing circuitry for, in said first case, successively accessing a plurality of memory boundaries, including a memory boundary where an address to be accessed exists, by wrapping around from said memory boundary where an address to be accessed exits, and successively providing n-byte units derived therefrom to said external bus, and in said second case, successively accessing a plurality of memory boundaries, including a memory boundary where an address to be accessed exists, by wrapping around from said memory boundary where an address to be accessed exists, and successively providing n/2-byte units derived therefrom to said external bus;*

*address generating circuitry for generating a head address of said memory boundary where said address to be accessed exists; and*

*a bus interface circuit for (1) accessing successively the inside of said memory area in an order from the head address of addresses generated by said address generating circuitry, and (2) in each of said first and second cases, accomplishing said accessing in an order which does not vary depending on whether said address to be accessed is within the upper half of an n-byte unit beginning at the memory boundary where said address to be accessed exists, or the lower half of said n-byte unit.*

*19. A data processing apparatus comprising:*

*a processor;*

*a data bus having a bus width;*

*a first memory for storing blocks of data which is coupled to or within said processor;*

*a second memory which is coupled to said processor through said bus, said second memory having a plurality of addressable memory locations which are capable of being organized into blocks of data;*

*a bus-sizer for switching between a state of using a part of the bus width of said data bus for accessing said second memory and a state of using all of said bus width for accessing said second memory;*

*circuitry for, responsive to a signal representative of a condition in which an operand desired by the processor is not stored in the first memory, (a) accessing a block in the second memory containing said operand through a series of accesses of memory locations sufficient to retrieve said block, (b) transmitting said block over said bus through a series of successive transfers of data units over said bus, said units having a first width in the case in which all of said bus width of said data bus is used, and having a second width less than said first width in the case in which a part of the bus width of said data bus is used, and (c) storing said transmitted block in said first memory.*

*20. The apparatus of claim 19 wherein said processor comprises a microprocessor, and said first memory comprises a cache memory.*

*21. A method for accessing memory in a data processing system including a microprocessor, a first memory for storing blocks of data, a data bus having an effective bus width selectable between a first width and a second width less than said first width, and a second memory which is connected to said microprocessor through said data bus, said second memory having a plurality of addressable memory locations which are capable of being organized into blocks, and which define a plurality of memory boundaries spaced by said first width, the method comprising the steps of:*

*selecting whether the effective bus width of said data bus is to be said first width or said second width;*

*generating a signal indicating that an operand desired by the microprocessor is not present in said first memory;*

*responsive to said signal, generating an address of a memory location within a block of the second memory which contains the operand;*

*accessing said block through a series of accesses of memory locations sufficient to retrieve said block;*

*transmitting said block over said bus through a series of successive transfers of data units over said bus, said data units having a width which is less than or equal to said selected width;*

*if the effective bus width is selected to be said first width, beginning said transmitting with a data unit beginning on one of said memory boundaries and containing at least part of said desired operand;*

*if the effective bus width is selected to be said second width, beginning said transmitting with a data unit beginning on one of said memory boundaries and wholly excluding said desired operand; and*

*storing said transmitted block in said first memory.*

*22. A method for accessing memory in a data processing system including a microprocessor, a first memory for storing blocks of data, a data bus having an effective bus width selectable between a first width and a second width less then*

*said first width, ad a second memory which is connected to said microprocessor through said data bus, said second memory having a plurality of addressable memory locations which are capable of being organized into blocks of data segments having said first width, the method comprising the steps of:*

*selecting whether the effective bus width of said data bus is to be said first width or said second width;*

*generating a signal indicating that an operand desired by the microprocessor is not present in said first memory;*

*responsive to said signal, generating an address of a memory location within a particular data segment of a block of the second memory at which said operand begins;*

*accessing said block through a series of accesses of memory locations sufficient to retrieve said block;*

*transmitting said block over said bus through a series of successive transfers of data units aver said bus, said data units having a width which is less than or equal to said selected width;*

*when the effective bus width is either of said first and second widths accomplishing said transmitting in an order which does not vary depending on where the desired operand begins within said particular segment having said first width; and*

*storing said transmitted block in said first memory.*

*23. A method of accessing a block of memory through a data bus in a data processing system including a microprocessor, cache memory coupled to or within the microprocessor for storing blocks of data, an external data bus having a selectable width, and an external memory coupled to said microprocessor through said bus, comprising the steps of:*

*selecting a width from a plurality of predetermined widths;*

*sizing said bus to said selected width;*

*in response to a cache miss condition, accessing said block from said external memory, and transmitting said block over said bus through a burst of successive transfers of data units, said data units having a width which is less than or equal to said selected width;*

*accomplishing said transmitting beginning with a data unit wholly excluding said desired operand; and*

*updating said cache memory with said transmitted block.*

*24. A method for accessing memory in a data processing system including a microprocessor, a first memory for storing blocks of data, a data bus having an effective bus width selectable between a first width and a second width less than said first width, and a second memory which is connected to said microprocessor through said data bus, said second memory having a plurality of addressable memory locations which are capable of being organized into blocks of data, the method comprising the steps of:*

*selecting whether the effective bus width of said data bus is to be said first width or said second width;*

*generating a signal indicating that an operand desired by the microprocessor is not present in said first memory;*

*responsive to said signal, generating an address of address of a memory location within a block of the second memory which contains the operand;*

*accessing said block through a series of accesses of memory locations sufficient to retrieve said block;*

*transmitting said block over said bus through a series of successive transfers of data units over said bus, said data unit having a width which is less or equal to said selected width;*

*if said effective width of said data bus is selected to be said first width, accomplishing said transmitting beginning with a data unit containing at least in part the desired operand;*

*if said effective width said data bus is selected to be said second width, accomplishing said transmitting beginning with a data unit wholly excluding said desired operand; and*

*storing said transmitted block in said first memory.*

*25. A method for accessing memory in a data processor, said data processor having a microprocessor, means for storing a block of data, an external data bus having an effective bus width selectable, between n-bytes and n/2 bytes, wherein n is an even integer, and an external memory which is connected to said microprocessor through said external data bus, said external memory having a plurality of addressable memory locations each having width of n-bytes and each having upper half and a lower half, the method comprising the steps of:*

*selecting whether said effective bus width of said external data bus is to be n-bytes, or n/2 bytes;*

*generating an access request to access a specific addressable memory location in said external memory;*

*generating a head address of a block of data to be accessed, wherein said head address is generated based on said specific addressable memory location;*

*accessing said external memory, wherein said accessing is accomplished in a series of accesses sufficient to retrieve a block of data;*

*generating a bus transfer finishing signal upon completion of each of said series of accesses;*

*transferring said block of data through an internal data bus said internal data bus, having a bus width equal to n-bytes;*

*when the effective bus width is n-bytes and when the effective bus width is n/2-bytes, storing said block of data, wherein said storing is accomplished in an order which does not vary depending upon whether said specific addressable memory location begins within the upper half of an n-byte unit, or within the lower half of the n-byte unit; and*

*transferring said block of data to said means for storing.*

*26. A method for accessing memory in a data processor, said data processor having a microprocessor, means for storing a block of data, an external data bus having an effective bus width selectable between n-bytes and n/2 bytes, wherein n is an even integer, and an external memory which is connected to said microprocessor through said external data bus, said external memory having a plurality of addressable memory locations each having a width of n-bytes and each having upper half and a lower half the method, comprising the steps of:*

*selecting whether said effective bus width of said external data bus is to be n-bytes or n/2 bytes;*

*generating an access request to access a specific addressable memory location said external memory;*

*generating a head address of a block of data to be accessed, wherein said head address is generated based on said specific addressable memory locations;*

*accessing said external memory, wherein said accessing is accomplished in a series of accesses sufficient to retrieve a block of data;*

*generating a bus transfer finishing signal upon completion of each of said series of accesses;*

*transferring block of data through an internal data bus, said internal data bus having a bus width equal to n-bytes;*

*when the specific addressable memory location begins within the upper half of an n-byte unit, and when it begins within the lower half of an n-byte unit storing said block of data, wherein said storing is accomplished in a certain order if said external bus width is n-bytes, and is accomplished in the same order if said external bus width is n/2 bytes; and*

*transferring said block of data to said means for storing.*

*27. The method of claim 26 in which n is 8 and said block of data is 256 bits wide.*

*28. A method for accessing memory in a data processing system including a microprocessor, a first memory for storing blocks of data, a data bus having an effective bus width selectable between a first width and a second width less than said first width, and a second memory which is connected to said microprocessor through said data bus, said second memory having a plurality of addressable memory locations which are capable of being organized into blocks, the method comprising the steps of:*

*selecting whether the effective bus width of said data bus is to be said first width or said second width;*

*generating a signal indicating that an operand desired by the microprocessor is not present in said first memory;*

*responsive to said signal, generating an address of a memory location within a block of the second memory which contains the operand;*

*accessing said block through a series of accesses of memory locations sufficient to retrieve said block;*

*transmitting said block over said bus through a series of successive transfers of data units over said bus, said data units having a width which is less than or equal to said selected width;*

*if said effective bus width is selected to be said first width, providing said data units to an internal bus;*

*if said effective bus width is selected to be said second width, successively combining selected ones of said data units into combined data units, and providing said combined data units to said internal bus; and*

*storing said transmitted block in said first memory.*

*29. A method of accessing a block of memory having a width and containing a desired operand through a data bus in a data processing system including a microprocessor, a cache memory coupled to or within the microprocessor for storing blocks of data, an external data bus having a selectable width, and an external memory coupled to said microprocessor through said bus, comprising the steps of:*

*selecting a width from a plurality of predetermined widths;*

*sizing said bus to said selected width;*

*in response to a cache miss condition, accessing said block from said external memory, and transmitting said block over said bus through a burst of successive transfers of data units, said data units having a width which is less than or equal to said selected width;*

*successively combining selected ones of said data units into combined data units, and providing said combined units to said internal bus; and*

*updating said cache memory with said transmitted block.*

*30. A data processor apparatus comprising:*

*a processor;*

*a data bus having a bus width;*

*a first memory for storing blocks of data which is coupled to said processor through an internal bus;*

*a second memory which is coupled to said processor through said data bus, said second memory having a plurality of addressable memory locations which are capable of being organized into blocks of data;*

*a bus-sizer for switching between a state of using a part of the bus width of said data bus for accessing said second memory and a state of using all of said bus width for accessing said second memory;*

*circuitry for, responsive to a signal representative of a condition in which an operand desired by the processor is not stored in the first memory, (a) accessing a block in the second memory containing said operand through a series of accesses of memory locations sufficient to retrieve said block, (b) transmitting said block over said bus through a series of successive transfers of data units over said bus, said units having a first width in the case in which all of said bus width of said data bus is used, and having a second width less than said first width in the case in which a part of the bus width of said data bus is used, (c) if all of said bus width of said data bus is used, providing said data units to said internal bus, (d) if part of said bus width of said data bus is used, successively combining selected ones of said data units into combined units, and providing said combined units to said internal bus, and (e) storing said transmitted block in said first memory.*

*31. A data processor apparatus comprising:*

*a processor;*

*a data bus having a bus width;*

*a first memory for storing blocks of data which is coupled to said processor through an internal bus;*

*a second memory which is coupled to said processor through said data bus, said second memory having a plurality of addressable memory locations which are capable of being organized into blocks of data;*

*a bus-sizer for switching between a state of using a part of the bus width of said data bus for accessing said second memory and a state of using all of said bus width for accessing said second memory;*

*circuitry for, responsive to a signal representative of a condition in which an operand desired by the processor is not stored in the first memory, (a) accessing a block in the second memory containing said operand through a series of accesses of memory locations sufficient to retrieve said block, (b) transmitting said block over said bus through a series of successive transfers of data units over said bus, said data units having a first width in the case in which all of said bus width of said data bus is used, and having a second width less than said first width in the case in which a part of the bus width of said data bus is used, (c) if all of said bus width of said data bus is used, beginning said transmitting with a data unit containing at least in part said desired operand, (d) if part of said bus width of said data bus is used, beginning said transmitting with a data unit which may wholly exclude said desired operand, and (e) storing said transmitted block in said first memory.*

*32. A data processor apparatus comprising:*

*a processor;*

*a data bus having a bus width;*

*a first memory for storing blocks of data which is coupled to said processor through an internal bus;*

*a second memory which is coupled to said processor through said data bus, said second memory having a plurality of addressable memory locations which are capable of being organized into blocks of data defining a plurality of memory boundaries spaced by a first width;*

*a bus-sizer for switching between a state of using a part of the bus width of said data bus for accessing said second memory and a state of using all of said bus width for accessing said second memory;*

*circuitry for, responsive to a signal representative of a condition in which an operand desired by the processor is not stored in the first memory, (a) accessing a block in the second memory containing said operand through a series of accesses of memory locations sufficient to retrieve said block, (b) transmitting said block over said bus through a series of successive transfers of data units over said bus, said data units having said first width in the case in which all of said bus width of said data bus is used, and having a second width less than said first width in the case in which a part of the bus width of said data bus is used, (c) if all of said bus width of said data bus is used, beginning said transfers with a data unit beginning on one of said plurality of memory boundaries spaced by said first width, (d) if part of said bus width of said data bus is used, also beginning said transfers with a data unit beginning on one of said plurality of memory boundaries, even if said data unit wholly excludes said desired operand, and (e) storing said transmitted block in said first memory.*

*33. A method for accessing memory in a data processing system including a microprocessor, a first memory for storing blocks of data, a data bus having an effective bus width selectable between a first width and a second width less than said first width, and a second memory which is connected to said microprocessor through said data bus, said second memory having a plurality of addressable memory locations which are capable of being organized into blocks of data, the method comprising the steps of:*

*selecting whether the effective bus width of said data bus is to be said first width or said second width;*

*generating a signal indicating that an operand desired by the microprocessor is not present in said first memory;*

*responsive to said signal, generating an address of a memory location within a block of the second memory which contains the operand;*

*accessing said block through a series of accesses of memory locations sufficient to retrieve said block;*

*transmitting said block over said bus through a series of successive transfers of data units over said bus, said data units having a width which is less than or equal to said selected width;*

*if said effective width of said data bus is selected to be said first width, accomplishing said transmitting in a certain order beginning with a data unit containing at least in part the desired operand;*

*if said effective width of said data bus is selected to be said second width, accomplishing said transmitting in the same order beginning with a data unit wholly excluding said desired operand; and*

*storing said transmitted block in said first memory.*

*34. A data processor comprising a microprocessor, an external data bus having a bus width, and an external memory which is connected to said microprocessor, and which has a plurality of addressable memory locations which are capable of being organized into blocks of data segmented by memory boundaries spaced by a first width, wherein said data processor is provided with:*

*bus-sizing means for switching between a state of using a part of the bus width of said external data bus and a state of using all of said bus width for accessing said external memory;*

*accessing means for, responsive to a signal representative of a condition in which an operand desired by the processor is not stored in the external memory, accessing said external memory successively by executing a predetermined number of external bus accesses as a set, and*

*a bus interface circuit for receiving a request for an access start and starting an external bus access to said external memory; and*

*wherein said bus interface circuit, in response to a request for an access start*

*when all of said bus width of said external data bus is used, generates a single set of successive external bus accesses, and receives successive data units over said external bus in response thereto, the data units having said first width, beginning with a data unit on one of said memory boundaries spaced by said first width, and*

*when a part of the bus width of the external data bus is used, generates a plurality of sets of successive external bus accesses, starts each set of successive external bus accessing by generating addresses for the first external bus access of each set of successive external bus accesses to access successively a memory area of the same size as in the case where all of said bus width of said external data bus is used, and, for each set, receives successive data units over said external bus in response thereto, the data units having a width less than said first width, beginning with a data unit on one of said memory boundaries spaced by said first width even when the data unit wholly excludes the desired operand.*

* * * * *